United States Patent [19]
Ackermann et al.

[11] Patent Number: 4,878,227

[45] Date of Patent: Oct. 31, 1989

[54] DEVICE FOR A MODULAR POWER LASER

[76] Inventors: Frank Ackermann, Hohenzollerastr. 13, 4000 Stuttgart; Reinhard Wollermann-Windgasse, Hòhenstr. 13, 7143 Vaihingen/Enz-Riet; Bernd Faller, Hirschlanderstr. 2, 7257 Ditzingen, all of Fed. Rep. of Germany

[21] Appl. No.: 115,419

[22] Filed: Nov. 2, 1987

[51] Int. Cl.$^4$ .............................................. H01S 3/08
[52] U.S. Cl. ...................................... 372/107; 372/65; 372/61
[58] Field of Search .................... 372/61, 62, 55, 92, 372/93, 65, 107

[56] References Cited

U.S. PATENT DOCUMENTS

| | | | |
|---|---|---|---|
| 4,564,948 | 1/1986 | Golser | 378/61 |
| 4,679,209 | 7/1987 | Klingel | 372/61 |
| 4,815,093 | 3/1989 | Wollermann-Windgasse | 372/61 |

Primary Examiner—Léeon Scott, Jr.

[57] ABSTRACT

A modular CO2 laser has two end-flange devices, at least one intermediate-flange device, at least one metallic support tube that is resistant to bending and has two end regions fixedly mounted in the two end-flange devices and a central region to which the intermediate-flange device is secured. A partially-transmitting mirror device is provided at at least one of the end-flange devices, the mirror device comprising a mirror and a massive support plate carrying a mounting for the mirror. An adjusting-screw device is provided, which comprises a reference position forming an origin of X axis and Y axis coordinates. Two metal screws are situated in the X axis and Y axis respectively, the mirror being adjustable by rotation of at least one of the screws. The metal of the metallic support tube has a coefficient of thermal expansion that is not particularly low, and the metal of the metal screws has a particulary low coefficient of thermal expansion.

5 Claims, 4 Drawing Sheets

DEVICE FOR A MODULAR POWER LASER

The invention relates to a device for a modular CO2 laser.

BACKGROUND OF THE INVENTION

In lasers, an endeavor is made to have a zero-order mode, as is described in German Laid Open Specification No. 3,422,525. The maintenance of an optimal mode is essentially dependent upon whether it is possible to maintain the geometric shape of the laser in operation, because the geometric shape of the laser also determines the shape of the resonator. An essential problem involved in maintaining the geometric shape resides in that, in operation, the laser becomes hot, expands—possibly irregularly—the resonator is thereby given a different geometric shape and thus the mode deteriorates. Accordingly, from the mechanical side it has since been attempted to use low-expansion steels, as they have become known, for example, as Invar steels (trademark of Creusot-Loire (see Rompps Chemie-lexikon [Rompps Chemical Dictionary] 8th edition, page 1906 or Enzyklopadie Naturwissenschaft und Technik [Encyclopedia of Natural Science and Technology], page 2051).

In the Federal Republic of Germany, the applicant previously has demonstrably used a laser which exhibits a continuous support tube for intermediate flanges and end flanges. The end flanges and intermediate flanges are rigidly secured on this support tube, while the glass tubes in which lasing takes place are made of quartz.

In this case, the support tube was made of such an Invar steel. However, this material has the disadvantage that it is extremely expensive and exhibits quite substantially poorer processing qualities than normal steel.

These lasers have, at their end flanges, 180 degree mirrors, one of which is non-transmitting and the other of which is partially-transmitting. The non-transmitting mirror throws the beam back again into the resonator, while the partially-transmitting mirror couples out the laser beam according to the measure of its transmissivity, but likewise throws the other component back again into the resonator.

For the adjustment of the laser, the mirrors are movable insofar as they are rigidly connected to support plates, the position of which is adjustable by screws—differential screws—in two mutually perpendicular directions. When the laser is hot under operational conditions, the support plate belonging to the non-transmitting and/or paritally-transmitting mirror is set to resonator oscillation conditions which are as close as possible to the zero mode or even reach it.

These screws are made of brass. Brass has, per se, the advantage that the screws can be produced more cheaply, and the accuracy of these screws can also be maintained better when the material is brass.

However, it has emerged that customers attempt to adjust these brass screws, probably because the quality of the oscillation was no longer correct. However, it is more than difficult for a layman to set the mirrors correctly.

OBJECT AND STATEMENT OF THE INVENTION

Lasers of the type of the invention have two end-flange devices, at least one intermediate-flange device, at least one metallic support tube that is resistant to bending and has two end regions fixedly mounted in the two end-flange devices and a central region to which the intermediate-flange device is secured. Such lasers also have gas pipes between the two end-flange devices, the gas pipes having a coefficient of thermal expansion different from that of the metallic support tube and having end regions mounted in the flange devices as as to be floating in terms of thermal expansion. At least one at most partially-transmitting mirror device is provided at at least one of the end-flange devices, the mirror device comprising a mirror and a massive support plate carrying a mounting for the mirror. And, an adjusting-screw device is provided, which comprises a reference position and two metal screws, the reference position forming an origin of X axis and Y axis coordinates and the two metal screws being situated in the X axis and Y axis respectively, the mirror being adjustable by rotation of at least one of the screws.

The object of the invention is on the one hand to reduce the costs for the laser and on the other hand to maintain the quality of the oscillation—in particular with respect to thermal changes in length.

According to the invention, this object is achieved by the following features:

(a) the metal of the metallic suppport tube has a coefficient of thermal expansion that is not particularly low, and (b) the metal of the metal screws has a particularly low coefficient of thermal expansion.

It has become evident that the extremely expensive Invar tube is not necessary at all, and that it is sufficient to make the screws as Invar screws. When the laser has reached thermal resonance and the mirrors are set by means of the Invar screws, then the oscillation quality remains substantially constant. Now, the customers are also no longer tempted to make attempts themselves to set the screws.

In addition, the described embodiment includes the following advantageous features:

The metallic support tube is a hydraulic tube. This achieves a highly accurate tube which is entirely adequate in terms of the steel and which is nevertheless cheap.

The reference position has a screw thereat. By this feature, all three positions possess screws: this makes the adjustment conditions simpler. It is then also easier to survey the overall result. It would, however, be possible, per se, to fix the reference position in its location by detents, needle tips, spacers or the like.

Means protect the metal screws against unauthorized rotation. Unauthorized persons are prevented from adjusting the screws, whether as a result of previous accustomed practice or as a result of frivolity. This securing of the screws can take place in the most widely varying ways, such as, for example, by means of sealing wax, by lead sealing or by imparting a specific design to the screw head, so that no tool is normally available for rotation thereof, as is known, for example, from the art of the protection of high-quality automobile rims.

The metal screws are situated at the partially-transmitting mirror device.

DESCRIPTION OF THE DRAWINGS

The inventions is now described with references to a preferred illustrative embodiment. In the drawings.

DETAILED DESCRIPTION OF A PREFERRED EMBODIMENT

Figure 1:
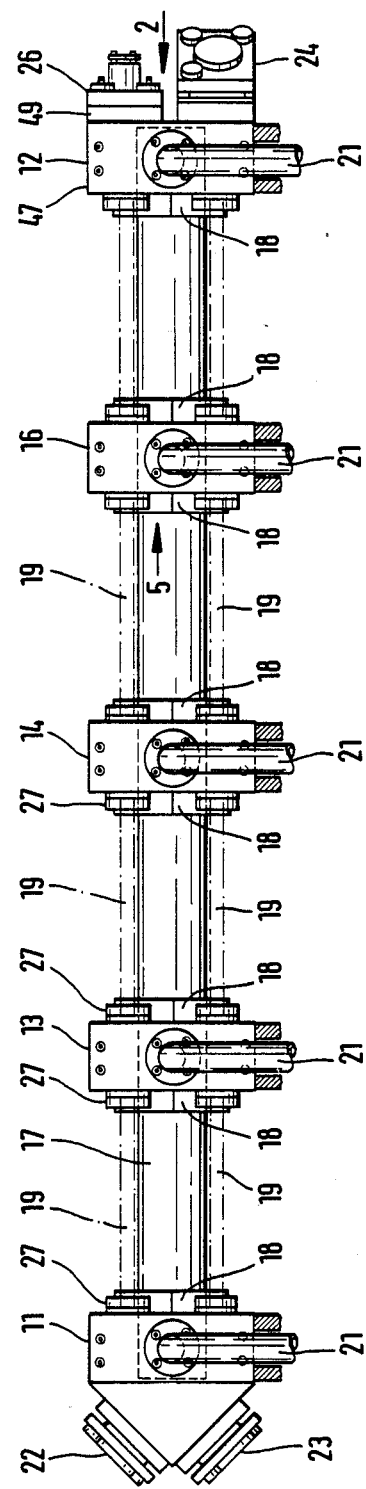
FIG. 1 shows the side elevation of a laser.

A laser according to FIG. 1 has a left-hand end flange 10 11, a right-hand end flange 12 and three intermediate flanges 13, 14, 16. A circular-cylindrical tube 17, such as is used in hydraulics and which is made of the steel customary therein, has an external diameter of approximately 10 cm. Its left-hand end region is rigidly mounted by means of a mounting 18. The tube 17 then traverses, towards the right, the intermediate flanges 13, 14, 16, which are approximately bored through, and, there also, similar mountings are used for the purpose of rigidly securing these flanges on the tube 17. The right-hand end region is mounted in the end flange 12 by means of a similar mounting 18. Quartz tubes 19 are provided between the flanges, and specifically four units in each instance in the region between each flange. The other two quartz tubes 19 are situated at the same height in each instance behind these quartz tubes 19 shown in broken lines. Laser gas is suppled to or withdrawn from the flanges, as shown, from the front and also from the rear, via gas pipes 21. The left-hand end flange 11 has two front 45° mirrors 22, 23 and two 45° mirrors which are situated there behind and which are not shown. The right-hand end flange 12 has two 45° mirrors 24, which couple the front end rear segments of the laser beams. Above the 45° mirrors 24 there is provided a 180° mirror device 26, which exhibits a partially-transmitting mirror which remains to be discussed later and couples out, towards the right, a component of the laser beam from the upper, visible segment. Behind the 180° mirror device there is provided, in coincidence, a further 180° C. mirror device, which reflects the laser beam totally into the resonator. The two mirror devices are not mechanically distinguished from one another. Only the mirror itself has differing qualities in the two devices.

A description has thus given of a modular folded laser with four segments, which are connected in series.

The laser stands on a frame. In this case, the left-hand end flange 11 is fixedly connected to the frame, while the intermediate flanges 13, 14 and 16 and the right-hand end flange 12 are mounted on a sliding bearing, so that, on becoming heated, the laser can expand toward the right. The quartz tubes 19 are mounted at their two end regions in respective mountings 27. In this case, the mountings 27 have in their inner surface O-rings, which seal the space between the mountings 27 and the quartz tubes 19. These O-rings have the nature of rubber. Since the quartz tubes 19 virtually do not lengthen under the influence of heat, but the tube 17 moves towards the right, the end regions of the quartz tubes 19 can move slightly within the O-rings, so that no thermal stresses arise. The tube 17 is, in fact, internally liquid-cooled. Nevertheless, the tube 17 becomes warm, and expands towards the right, since a cooling to room temperature is not possible.

How it has been necessary to conceive the mountings 18, 27 in detail is evident from a simultaneously filed patent application 115,420 (my file 12,544). The end flanges 11, 12 and the intermediate flanges 13, 14 and 16 as well as the quartz tube 19 are symmetrical in relation to the geometrical central longitudinal axis on the circular-cylindrical tube 17, with the exception of the 45° mirrors 22, 23, 24 and of the 180° mirror devices 16. Accordingly, the laser merely has the tendency to expand linearly and not along a curve, so that the end flange 11 invariably stands parallel to the end flange 12, since the latter is moved by the thermal expansion in translation only.

Figure 2:
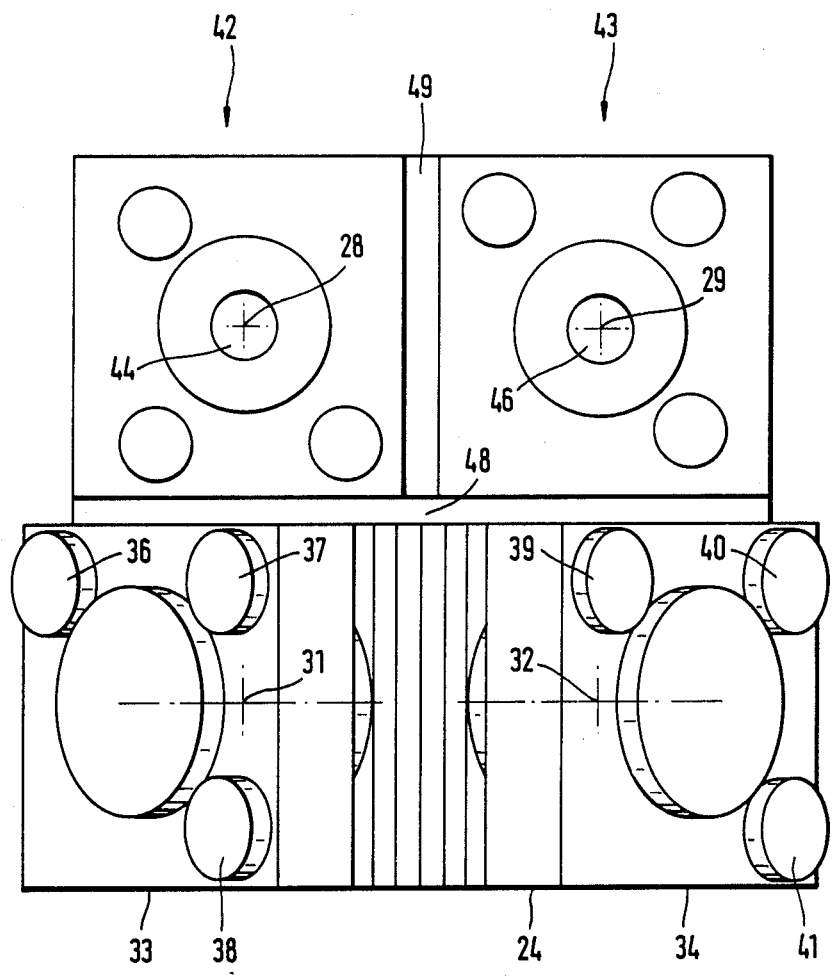
FIG. 2 shows an elevation according to the arrow 2 in FIG. 1.

According to FIG. 2, the folded laser beam extends along the four geometric longitudinal axes 28, 29, 31, 32. The deflection at the right-hand end of the geometrical longitudinal axis 31, 32 is provided by the individual mirror devices 33, 34. These have within themselves a 45° mirror surface. The 45° mirror surface can be adjusted by Invar screws, which are situated under covering caps 36, 37, 38, 39, 40, 41.

An individual mirror device 42 and an individual mirror device 43 are situated on the left at the top in FIG. 2. The individual mirror device 42 comprises a mirror body 44, which is partially-transmitting, and the individual mirror device 43 comprises a mirror body 46, which is totally reflecting. Apart from the mirror bodies 44, 46, the individual mirror devices 42, 43 are identical, so that in the text which follows only the individual mirror device 42 is described in greater detail. With this, seen from the statistical point of view, there occurs in practice also more frequently the case that it must be newly adjusted, since the mirror body 44, which reflects one component of the laser beam and transmits one component of the laser beam, becomes defective more frequently than the mirror body 46, for which reason it is also of the greatest importance to provide here the screws mentioned in the defining clause of the main claim. To keep the individual mirror device 33, 34 subsequently adjustable is not advisable, since two parameters are altered in the course of the adjustment at only one position, on account of the 45° location. Accordingly, in production and later in operation, it is also the case that a procedure is adapted such that the end flanges 11, 12 (laser heads) are adjusted at the manufacture's using an auxiliary laser and that, from that time onwards, it is intended that only the individual mirror devices 42, 43 should be adjusted on the customer's premises. Should the adjustment not be possible by setting at the individual mirror devices 42, 43, then the end flanges 11, 12 are sent in to the manufacturer, since a setting of the 45° mirrors 22, 23, 24 is virtually impossible on the customer's premises.

The end flange 12 comprises a cubic aluminum block 47, which has a source edge length of approximately 22 cm and which is approximately 9 cm thick. It has a plane end face 48. This is perpendicular to the geometrical longitudinal axes 28, 29, 31, 32. Onto the end face 48, it is upper semi-region, there is screwed a very flat steel plate 49, which is approximately 20 mm thick, is approximately 22 cm long at its top and bottom, and has a vertical edge dimension of approximately 11 cm. This is fixedly screwed to the end face 48 and has a screw bore 51, which represents the continuation of a throughbore 52.

Figure 3:
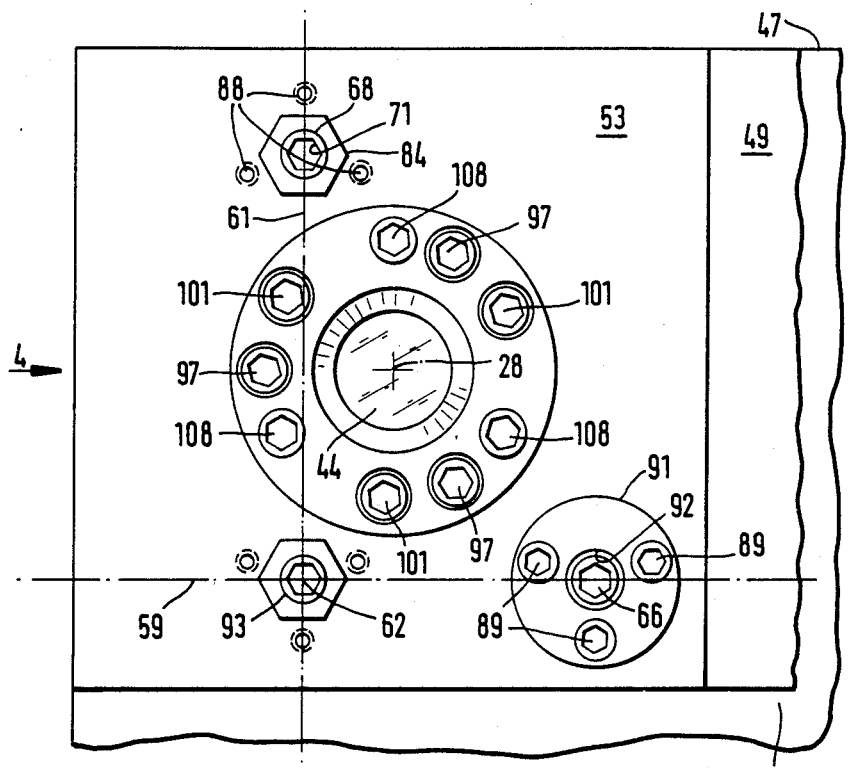
FIG. 3 shows an enlarged elevation of the left-hand upper region of FIG. 2.
Figure 4:
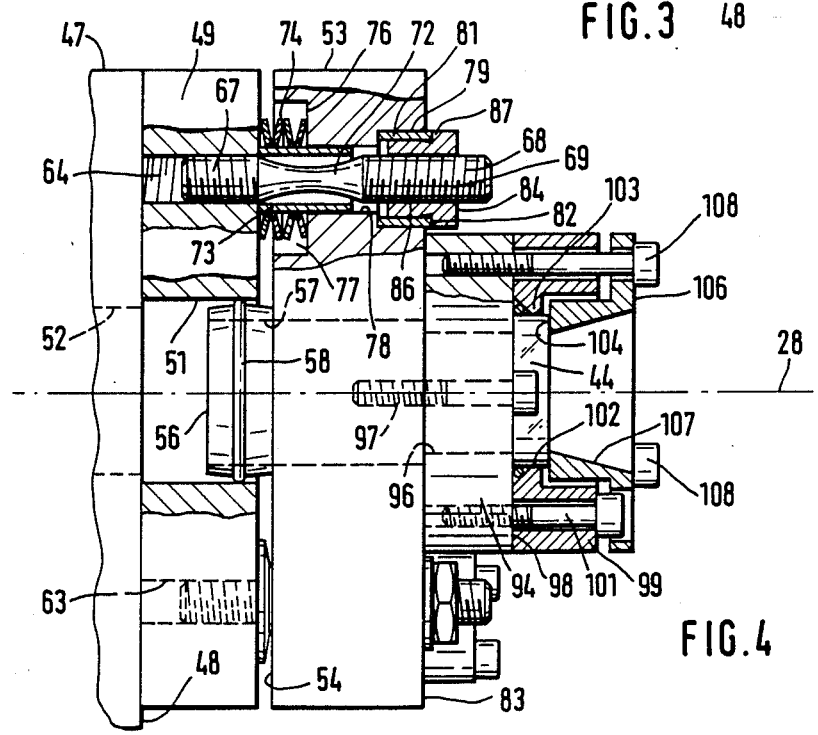
FIG. 4 shows an elevation of FIG. 3 according to the arrow 4 of FIG. 3, partly broken away.
Figure 5:
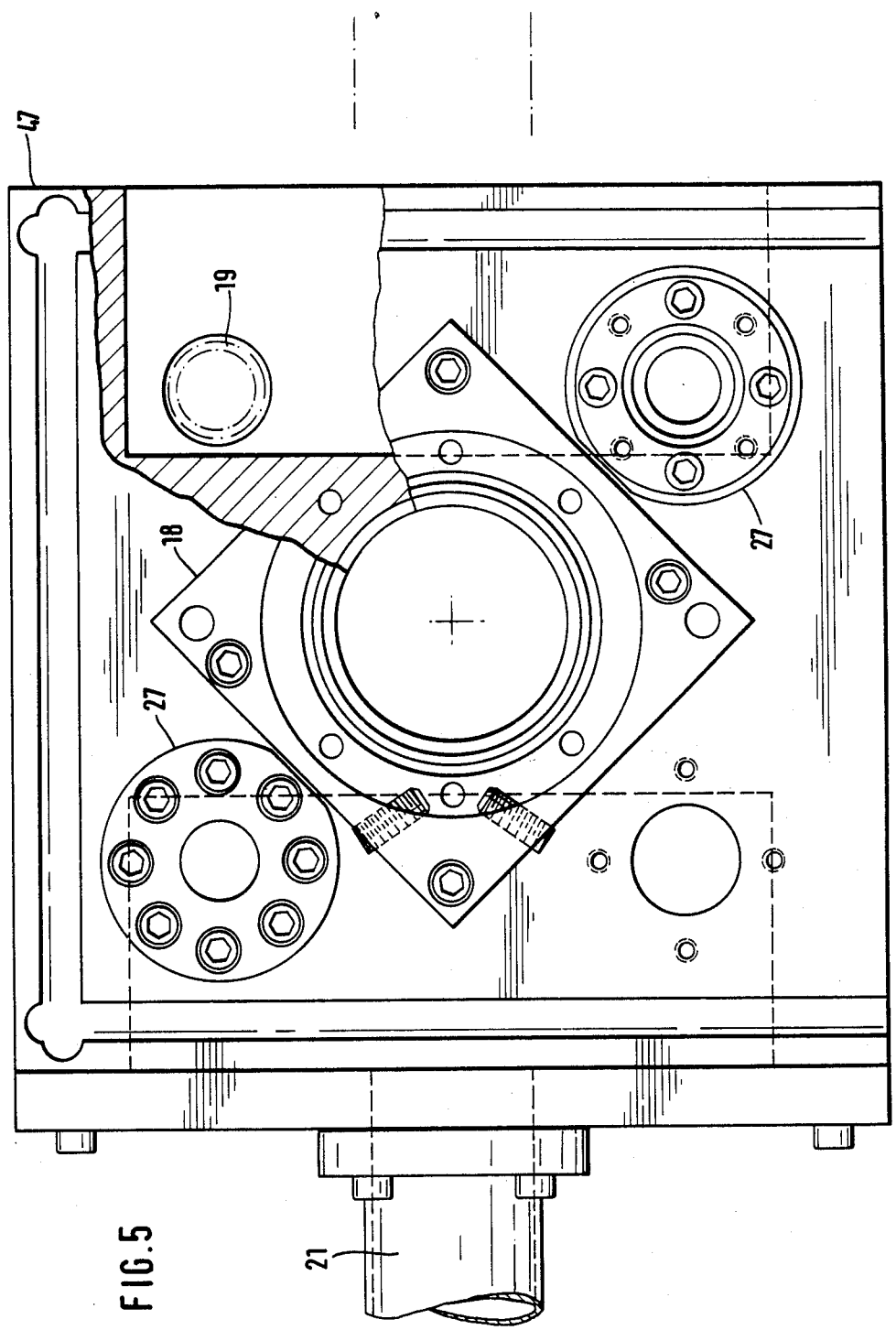
FIG. 5 shows an elevation according to the arrow 5 in FIG. 1.

A rectangular support plate 53 is made of aluminum. It has an edge length of 10.5 cm and is 2.5 cm thick. The representations of FIGS. 3 and 4 are 1:1 representations. All surfaces of the support plate 3—just as also the steel plate 49—are plane. Precisely centrally from the plane 54, on the left according to FIG. 4, of the support plate 53 there projects towards the left a cylindrical projection 56, which can be situated coaxially with the geometrical longitudinal axis 28. It has a central throughbore 57, which continues the throughbore 51 and which is also continued towards the right through the support plate 53. In a circumferential groove there is an O-ring 58, which rests tightly against the inner surface of the throughbore 51. As is evident from FIG. 4, the external periphery of the projection 56 is smaller than the diameter of the throughbore 51, so that—while still sealed off by the O-ring 58—the support plate 53 can tilt slightly about the longitudinal axis 28, without rubbing in the throughbore 51.

It is possible to devise on the steel plate 94 and the support plate 53 co-ordinate axes 59, 61, which have an origin 62. With the origin 62 as the centre, a threaded bore 63 is provided in the steel plate 49. A threaded bore 64 is provided above the throughbore 51 on the co-ordinate axis 61, and, corresponding to a screw 66, a threaded bore (not shown) is likewise provided on the co-ordinate axis 59 in the steel plate 49. Since the designs are to this extent the same, reference is now made only to the section broken away at the top in FIG. 4. In the threaded bore 64 there is screwed a threaded half 67 of a screw 68, which is constructed as a differential screw. The pitch of its other thread half 69 is opposite. In its outer end region, the thread half 69 has an internal hexagon 71. The central part 72, not provided with thread, of the screw 68 is situated in a metallic sleeve 73, the diameter of which is greater than the diameter of the threaded bore 64, so that it is upstanding on the steel plate 49 with its left-hand end face. In its left-hand region, it carries on the outside a stack of cup springs 74, which is supported under prestress at the right-hand surface of the steel plate 49. On the right, the stack of cup springs 84 [sic] is supported on the floor 76 of a depression 77, which is worked into the plane 54. Coaxially with the depression 77, there is provided in the support plate 53 a throughbore 78, the diameter of which is somewhat greater than the external diameter of the sleeve 73, so that the abovementioned tilting is possible. Approximately half of the sleeve 73 projects into the throughbore 78. Towards the right, the throughbore 78 continues into an enlargement bore 79, into which a steel sleeve 81 is pressed. Its right-hand end face 82 projects slightly beyond the right-hand plate 83 of the support plate. A hexagon nut 84 has an internal thread and continues with a collar 86 towards the left, which collar lies in the steel sleeve 81 with play. On the end face 82—consisting, of course, of steel—thus sits the nut 84 by its step 87 projecting beyond the collar 86, and it thus cannot become embedded in the aluminum of the support plate 53. The steel sleeve 81 is immovable within the enlargement bore 59. Around the steel sleeve 81 there are provided three threaded apertures 88, into which screws 89 are screwed, which hold a cover 91 of aluminum, which covers the hexagon nut 84 from outside, but leaves free in a central bore 92 the internal hexagon 71 and the right-hand part of the thread half 69. The screws 66 and 89 are supplemented by a similar screw 93. All three screws are made of Invar (registered trademark) steel.

Coaxially with the geometrical longitudinal axis 28, there is screwed on the plate 83 an intermediate ring 94, which exhibits a coaxial throughbore 96. It is screwed in a gas-tight manner by screws 97 against the plane 83. The intermediate ring 94 is circular-cylindrical. A mounting ring 99 is screwed onto its right-hand end face 98 by screws 101. The mounting ring 99 has a throughbore 102, which is larger in diameter than the throughbore 96, so that an annular abutment surface is formed there for the outer ring region, on the left in FIG. 4, of the mirror body 44. It rests thereagainst in a gas-tight manner. Its external periphery fits into the throughbore 102 and is to this extent guided there. The floor 103 of the mounting ring 99 is less high than the mirror body 44 is thick. On the right-hand outer edge region of the mirror body 44 there abuts the left-hand end face 104 of a pressure ring 106, which as a conical coaxial internal bore 107 and which is pressed towards the left by screws 108, the stems of which traverse the mounting ring 99 in throughbores and the threads of which are screwed into the intermediate ring 94. Accordingly, if it is desired to exchange the mirror body 44, then it is only necessary to unscrew the pressure ring 106, and the possibly damaged mirror body 44 can be removed.

In the course of adjustment, the screw 93 which is situated at the origin 62 of the co-ordinates 59, 61 is not adjusted. If the screw 68 is rotated and also the screw 66 is left unadjusted, then the mirror body 44 tilts about the co-ordinate axis 59, i.e. the laser beam moves upwards or downwards. Similar considerations apply if the screw 66 is adjusted but the screws 93 and 68 are left unadjusted. It is possible to apply sealing wax to the screws 66, 68, 93. It is also possible to bore them through at a suitable position and to lead-seal them by a wire. Furthermore, it is possible to provide fully sealing covers over the covers 91.

What is claimed is:

1. A device for a modular CO2 laser having
   two end-flange devices,
   at least one intermediate-flange device,
   at least one metallic support tube that is resistant to bending and has two end regions fixedly mounted in said two end-flange devices and a central region to which said intermediate-flange device is secured,
   gas pipes between said two end-flange devices, said gas pipes having a coefficient of thermal expansion different from that of said metallic support tube and having end regions mounted in said flange devices so as to be floating in terms of thermal expansion,
   at least one at most partially-transmitting mirror device at at least one of said end-flange devices, said mirror device comprising a mirror and a massive support plate carrying a mounting for said mirror,
   an adjusting-screw device, which comprises a reference position and two metal screws, said reference position forming an origin of X axis and Y axis coordinates and said two metal screws being situated in said X axis and Y axis respectively, said mirror being adjustable by rotation of at least one of said screws, and comprising the improvement wherein:
   (a) the metal of said metallic support tube has a coefficient of thermal expansion that is not particularly low, and
   (b) the metal of said metal screws has a particularly low coefficient of thermal expansion.

2. The device as claimed in claim 1, wherein said metallic support tube is a hydraulic tube.

3. The device as claimed in claim 1, wherein said reference position has a screw thereat.

4. The device as claimed in claim 1, wherein means protect said metal screws against unauthorized rotation.

5. The device as claimed in claim 1, wherein said metal screws are situated at said partially-transmitting mirror device.

* * * * *